350-360 SR

XR 3,609,222

United States Patent

[11] 3,609,222

[72] Inventor Walter Joseph Howarth
Trenton, N.J.

[21] Appl. No. 28,354
[22] Filed Apr. 13, 1970
[45] Patented Sept. 28, 1971
[73] Assignee RCA Corporation

[54] ELECTRO-OPTICAL IMAGE FORMING SYSTEM
7 Claims, 3 Drawing Figs.

[52] U.S. Cl. 178/5.4 BD, 178/7.2, 178/DIG. 27, 178/DIG. 28, 350/161
[51] Int. Cl. H04n 5/38, H04n 9/08, G03b 21/00
[50] Field of Search 178/7.2, 5.4 BD, DIG. 27, 7.5 D, 7.5 R, 5.4 ST, 7.8 T, 7.88, DIG. 28; 350/161; 353/20, 122

[56] References Cited
UNITED STATES PATENTS

| | | | |
|---|---|---|---|
| 3,016,417 | 1/1962 | Mast et al. | 178/7.5 D |
| 3,040,127 | 6/1962 | Lavin | 178/7.5 D |
| 3,485,944 | 12/1969 | Stephens | 178/5.4 BD |
| 3,538,251 | 11/1970 | Gear | 178/7.5 D |

*Primary Examiner*—Robert L. Griffin
*Assistant Examiner*—John C. Martin
*Attorney*—Eugene M. Whitacre

ABSTRACT: Light from a subject illuminates the reflecting member of electronic scanning apparatus the elemental areas of the reflecting member being selectively deformable by an unmodulated electron beam to direct reflected subject-derived light past a stop in a schlieren projection system and onto video signal-developing means.

3609222
OR IN 358/41

INVENTOR.
Walter J. Howarth
BY
Eugene M. Whitacre
ATTORNEY

ELECTRO-OPTICAL IMAGE FORMING SYSTEM

BACKGROUND OF THE INVENTION

This invention relates generally to systems for forming an image of a subject, and particularly to systems for generating video signals representative of a subject.

One of the ways which have been proposed for forming an image of a subject is by means of a schlieren optical system. Such a system is electro-optical in that it employs a medium which can be selectively and quantitatively distorted by the impingement thereon of an electron beam to reflect light from a source past a stop and onto appropriate image receiving means. Systems of this character require a separate source of light and means for modulating the intensity of the electron beam in a manner representative of the subject. Hence, they do not lend themselves to the direct projection of a subject image onto image-receiving means, such as a viewing screen, nor can such systems be used for the generation of video signals representative of the subject.

It, therefore, is an object of this invention to provide a novel electro-optical image-forming system employing the schlieren principle which may be used either for projecting an image of a subject or for developing video signals representative of a subject.

SUMMARY OF the INVENTION

The electro-optical image-forming system comprises electronic scanning apparatus which has an electrode that includes a deformable light-reflecting member and means for deflecting an unmodulated electron beam over the electrode so as to selectively deform elemental areas of the light-reflecting member. This member is illuminated by light derived from a subject, an image of which is to be formed on appropriate image receiving means. A schlieren optical system projects onto the image-receiving means the subject-derived light reflected from deformed areas of the light-reflecting member, the light from undeformed areas of the member being intercepted by a stop in the schlieren system. In a present preferred embodiment of the invention the image-receiving means comprises photosensitive signal generating apparatus by which video signals representative of the subject are developed.

For a more specific disclosure of the invention and its mode of operation reference may be had to the following detailed description of two illustrative embodiments thereof which is given in conjunction with the accompanying drawings, of which:

DESCRIPTION OF THE INVENTION

Figures 1, 2, 3:
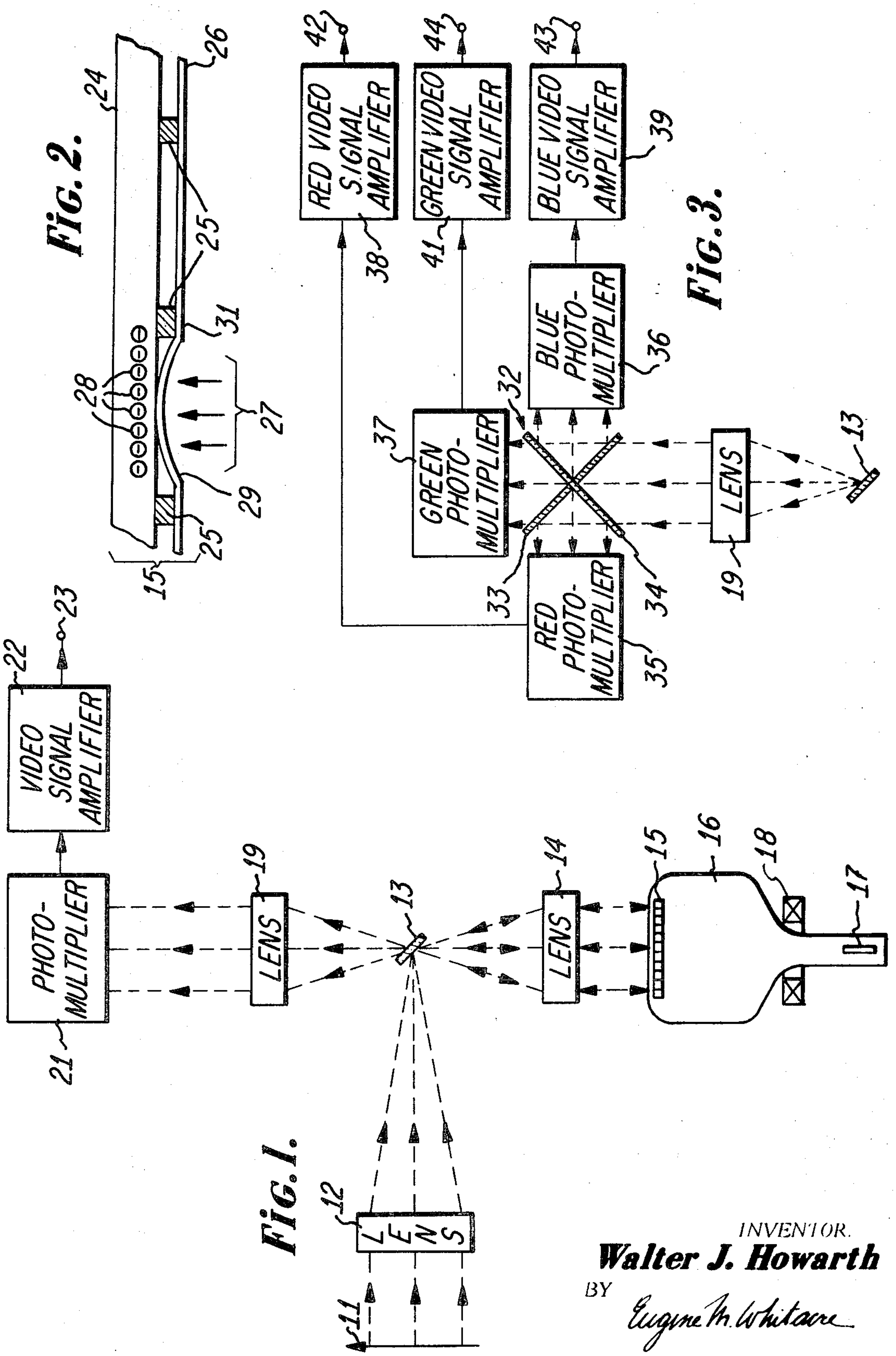
FIG. 1 is a diagrammatic illustration of a monochromatic video signal-generating embodiment of the invention.
FIG. 2 is a fragmentary view, to an enlarged scale, of an electrode of the scanning apparatus of FIG. 1.
FIG. 3 is a diagrammatic illustration of a color video signal-generating embodiment of the invention.

In FIG. 1 light from, and representative of, a subject 11 is directed by a lens 12 to the reflecting surface of a stop 13 in a schlieren optical system. The subject-derived light that is reflected from the schlieren stop 13 is directed by a collimating lens 14 to a light reflecting target electrode 15 of a scanning cathode-ray tube 16. The target electrode 15 is scanned by an unmodulated electron beam derived from a gun 17, the beam being deflected over the target electrode by means including a deflection yoke 18 which is energized in a conventional manner to scan a raster at the electrode 15. The impingement of the electron beam on an elemental area of the target electrode causes the light-reflecting member thereof to reflect the subject-derived light at that elemental area back through the lens 14 in a manner to pass the schlieren stop 13. All elemental areas of the target electrode 15 not impinged by the electron beam present undeformed reflecting member areas to the subject-derived light so that this light, when directed back through the lens 14, is intercepted by the schlieren stop 13. The manner in which the reflecting member of the target electrode 15 is deformed will be described presently.

The subject-derived light which is reflected from deformed elemental areas of the reflecting member of the target electrode 15 and which is not intercepted by the schlieren stop 13 is directed by a projection lens 19 to image-receiving means which, in this illustrative embodiment of the invention, is a photosensitive video signal-generating photomultiplier 21. The output of the photomultiplier 21 is impressed upon the input of a video signal amplifier 22, the amplified output of which is connected to an output terminal 23.

The target electrode 15 of the cathode-ray tube 16 is effectively a part of a scanning device of the type disclosed in a copending application of John A. van Raalte and Victor Christiano, Ser. No. 861,592, filed Sept. 29, 1969 and entitled *Intelligence-Handling Device Having Means for Limiting Induced Electrostatic Potential*. Essentially, as shown in FIG. 2, the target electrode 15 comprises an insulating substrate 24, such as glass (which conveniently may be the faceplate of the cathode-ray tube 16 of FIG. 1) on one plane surface of which there are a plurality of supporting conductors 25 which are electrically connected together (not shown). The spacing between adjacent conductors corresponds to the dimensions of an elemental area of the subject imaged on the electrode 15. The conductors 25 support, in spaced relation to the substrate 24, a light reflecting, electrostatically deformable, normally flat metal film 26 which may be made of alloys of metals such as nickel, copper or aluminum, for example. The film 26 is sufficiently thin to be pervious to an electron beam 27 so that a pattern of electrical charges 28 may be produced on the insulating substrate 24. Because, in the case of the present invention, the electron beam is unmodulated and, hence, always has the same intensity, the pattern of charges 28 is the same for all elemental areas of the target electrode that are selectively impinged by the electron beam 27. Thus, the deformation of each elemental area of the reflecting member 26 is the same and is sufficient to cause the reflection of the subject-derived light in the respective elemental areas of the subject past the schlieren stop 13 of FIG. 1 and onto the photomultiplier 21. The amount of subject-derived light so reflected, thus, is dependent solely upon the intensity of the light in the respective elemental areas of the subject. Light from all elemental areas of the subject not being scanned by the electron beam 27, such as that corresponding to the undeformed area 31 of the reflecting member 26, is reflected back and intercepted by the schlieren stop 13 of FIG. 1 and, thus, does not reach the photomultiplier 21. In this way the system of FIG. 1 develops a monochromatic (i.e., black and white) video signal at the terminal 23 which is representative of the subject 11.

FIG. 3 illustrates an embodiment of the invention by which color video signals representative of a subject, such as the subject 11 of FIG. 1, may be generated. The subject representative light which is reflected past the schlieren stop 13 is projected onto a light splitter 32 which separates it into its component colors. The light splitter 32 comprises crossed dichroic elements 33 and 34.

The dichroic element 33 is of a character to transmit green and blue light and to reflect red light to a red photomultiplier 35. The dichroic element 34 is of a character to transmit green and red light and to reflect blue light to a blue photomultiplier 36. The green light that is transmitted by the dichroic elements 33 and 34 is directed to a green photomultiplier 37. The respective outputs of the red, blue and green photomultipliers 35, 36 and 37 are impressed upon the inputs of red, blue and green video signal amplifiers 38, 39 and 41 the outputs of which are coupled respectively to terminals 42, 43 and 44.

It is to be understood that the image-receiving means, depicted in FIGS. 1 and 3 as photomultipliers, may be a viewing screen onto which an optical image of a subject may be projected by the apparatus of this invention. Also, the use of the invention is not limited to any particular kind of a subject. It may be represented by light reflected from a live scene or transmitted through a photographic transparency, for example. Additionally, instead of the particular form of schlieren optical system in which the stop 13 has a reflective surface by which to direct light from the subject onto the scanning cathode-ray tube target electrode 15, there may be used a modified schlieren system, such as that disclosed in a copending application of Edward G. Ramberg, Ser. No. 17,412, filed Mar. 9, 1970, and entitled *Optical System for Orthogonalizing Image Field of Projection Lens. In Lens.* Ramberg form of a schlieren optical system, the light from the subject would be directed by a collimating lens angularly toward the target electrode 15 from which it would also be reflected angularly toward the stop 13. In such a system a prism is included in the path of the angularly reflected light so as to effectively orthogonalize it relative to the projection lens 19 and the image-receiving means such as the photomultiplier 21 of FIG. 1 for example. In a schlieren optical system following the teaching of the Ramberg modification the stop only has to intercept the light reflected from undeformed areas of the target electrode 15 and hence, does not require that one surface thereof be light reflective as in the systems of FIGS. 1 and 3 herein.

Among the advantages of an image-forming system according to the present invention are reduced size, weight, complexity and cost of the apparatus. Also, when it is used in a signal-generating arrangement, setup time of the apparatus is less than that required for conventional apparatus. The system, when used to generate color video signals representative of a subject, is substantially free of image registration, gamma matching, shading and various instability problems normally encountered in a color television camera utilizing a plurality of image pickup devices for producing color representative video signals.

What is claimed is:

1. In an electro-optical system, apparatus for forming an image of a subject, comprising:

electronic scanning apparatus including an electrode having a deformable light-reflecting member;

image-receiving means;

A schlieren projection system for projecting said image onto said electrode and for projecting onto said image-receiving means subject-derived light reflected from deformed areas of said reflecting member;

said projection system having a stop for intercepting light reflected from undeformed areas of said reflecting member; and said electronic scanning apparatus including an unmodulated electron beam for deforming selected elemental areas of said reflecting member to cause the subject-derived light reflected from said selected areas to pass said stop and, thereby, to be projected onto said image-receiving means.

2. In an electro-optical system as defined in claim 1, signal generating apparatus, wherein:

said image-receiving means comprises photosensitive signal-generating apparatus responsive to said reflected subject-derived light to develop video signals representative of said subject.

3. Signal-generating apparatus as defined in claim 2, wherein:

said photosensitive apparatus comprises a photomultiplier; and a video signal amplifier coupled to the output of said photomultiplier.

4. Signal-generating apparatus as defined in claim 2 wherein:

said photosensitive apparatus comprises a plurality of photomultipliers; and said projection system includes a light splitter for separating into components the subject-derived light reflected by said reflecting member and passing said stop, and for directing said light components to respective ones of said photomultipliers.

5. Signal-generating apparatus as defined in claim 4, wherein:

said photosensitive apparatus comprises three photomultipliers responsive respectively to red, green and blue components of said subject-derived light to develop, respectively, red, green and blue light representative video signals; and said light splitter comprises a set of dichroic elements for separating into red, green and blue components said projected subject-derived light and for directing said separated red, green and blue light components respectively to said red, green and blue light responsive photomultipliers.

6. Signal-generating apparatus as defined in claim 5, and additionally including:

three video signal amplifiers coupled respectively to the outputs of said red, green and blue responsive photomultipliers.

7. Signal generating apparatus as defined in claim 6, wherein:

said projection system stop has a reflective surface to direct light from said subject to the light reflecting member of said scanning apparatus electrode.

UNITED STATES PATENT OFFICE

CERTIFICATE OF CORRECTION

Patent No. 3,609,222 Dated September 28, 1971

Inventor(s) Walter Joseph Howarth

It is certified that error appears in the above-identified patent and that said Letters Patent are hereby corrected as shown below:

Column 1, Line 39, delete "present" and substitute -- presently --. Column 3, Line 8, "In lens" (in italics) should read -- In the --

Signed and sealed this 2nd day of May 1972.

(SEAL)
Attest:

EDWARD M.FLETCHER,JR.
Attesting Officer

ROBERT GOTTSCHALK
Commissioner of Patents